United States Patent
Jeong et al.

(10) Patent No.: US 6,256,027 B1
(45) Date of Patent: *Jul. 3, 2001

(54) ON-SCREEN DISPLAY MENU IMPLEMENTING DEVICE AND METHOD FOR VIDEO DISPLAY APPLIANCE

(75) Inventors: Seok Hwa Jeong; Chang Woo Han, both of Kyoungsangbuk-Do (KR)

(73) Assignee: LG Electronics Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/042,033

(22) Filed: Mar. 13, 1998

(30) Foreign Application Priority Data

Nov. 11, 1997 (KR) .................................. 7-59235

(51) Int. Cl.$^7$ ........................................ G06F 9/00
(52) U.S. Cl. ................................... 345/342; 345/335
(58) Field of Search ........................... 345/11, 157, 327, 345/352, 355, 339, 342, 347

(56) References Cited

U.S. PATENT DOCUMENTS

| | | | |
|---|---|---|---|
| 5,557,724 | * 9/1996 | Sampat et al. | 345/327 |
| 5,724,492 | * 3/1998 | Matthews, III et al. | 345/355 |
| 5,764,179 | * 6/1998 | Tsurumoto | 345/157 X |
| 5,767,919 | * 6/1998 | Lee et al. | 345/157 X |
| 5,781,247 | * 7/1998 | Weymeyer et al. | 345/352 X |
| 5,828,351 | * 10/1998 | Wu | 345/11 |
| 5,844,556 | * 12/1998 | Takitani et al. | 345/339 |
| 5,889,506 | * 3/1999 | Lopresti et al. | 345/158 |
| 5,936,611 | * 8/1998 | Yoshida | 345/146 X |
| 5,945,991 | * 8/1999 | Britt et al. | 345/327 X |

FOREIGN PATENT DOCUMENTS

| | | | |
|---|---|---|---|
| 0 766 220 A1 | 6/1995 | (EP) | G09G/1/16 |
| 0 772 355 A2 | 11/1996 | (EP) | H04N/5/445 |
| 0 773 676 A2 | 11/1996 | (EP) | H04N/5/57 |
| 2 267 802 | 11/1992 | (GB) | H04N/5/445 |

OTHER PUBLICATIONS

OSD Operation of Q Vision 210 Color Monitor. See Chapter 3 'User's Guide', Compaq Computer Corporation, Mar./Oct. 1995.

* cited by examiner

Primary Examiner—Raymond J. Bayerl
Assistant Examiner—Cao H. Nguyen

(57) ABSTRACT

An on-screen display (OSD) menu implementing device for a video display appliance capable of implementing on a specified position of a display screen an OSD menu representing a control state of a selected function of the appliance, thereby enabling a user to conveniently adjust the selected function of the appliance. Various kinds of OSD menus are implemented by an OSD generating section under the control of a control section which outputs a control signal and control data for controlling the functions of the appliance such as a volume, brightness, contrast, horizontal size, vertical size, etc., in accordance with key signals selectively inputted from a key input section. The pattern, size, and color of constituent elements of the OSD menu displayed on the screen are selectively varied by the user through the key input section. The control state of the selected function can be visually recognized by the displayed OSD menu which includes unchangeable or fixed constituent elements such as characters, numerals, figures, symbols, etc., and variable or moving constituent element that varies or moves in proportion to the variation amount of control data provided from the control section, such as a moving histogram, circular graph, indicating needle, indicating bar, etc.

8 Claims, 3 Drawing Sheets

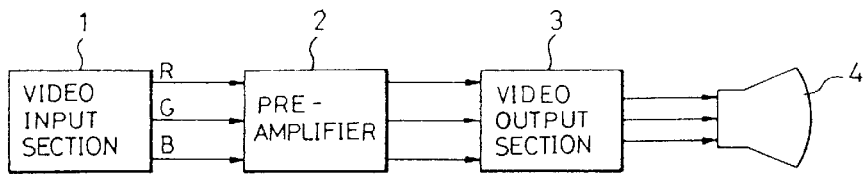
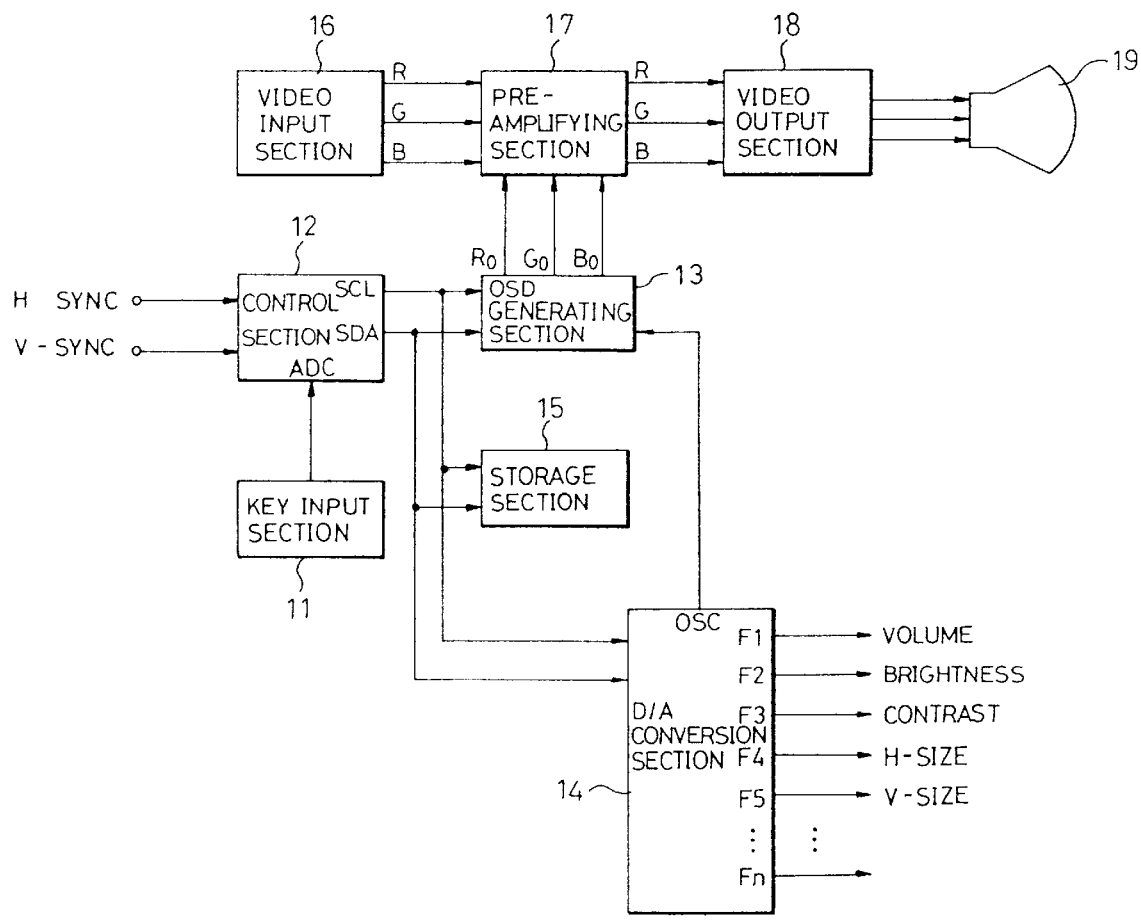

ON-SCREEN DISPLAY MENU IMPLEMENTING DEVICE AND METHOD FOR VIDEO DISPLAY APPLIANCE

BACKGROUND OF THE INVENTION

1. Field of the Invention

The present invention relates generally to an on-screen display of a video display appliance such as a television receiver, monitor, computer, etc. In particular, the present invention relates to an on-screen display (OSD) menu implementing device and method for a video display appliance which can implement on a specified position of a display screen an OSD menu representing a control state of a selected function of the video display appliance, thereby enabling a user to conveniently adjust the function of the video display appliance.

2. Description of the Related Art

A conventional display device of a video display appliance, as shown in FIG. 1, includes a video input section 1 for inputting a video signal of red (R), green (G), and blue (B), a pre-amplifier 2 for pre-amplifying the RGB video signal inputted through the video input section 1 with a predetermined level, a video output section 3 for outputting the video signal amplified by the pre-amplifier 2, and a display section 4 for displaying the video signal outputted from the video output section 3 on a display screen.

The operation of the conventional display device of a video display appliance as constructed above will be explained.

The RGB video signal inputted through the video input section 1 is amplified with a predetermined amplification factor by the pre-amplifier 2, and the amplified RGB video signal is inputted to the video output section 3.

The video output section 3 processes and outputs the amplified RGB video signal to the display section 4, so that the video signal is displayed on the display screen.

However, the conventional display device has the drawback that since it merely displays the video signal on the display screen without OSD function, a user cannot identify the control state of the selected function of the video display appliance even if the user controls the function thereof through key input means.

SUMMARY OF THE INVENTION

It is an object of the present invention to solve the problems involved in the related art, and to provide an on-screen display menu implementing device and method for a video display appliance which can implement on a specified position of a display screen an OSD menu representing the control state of a selected function such as sound volume, brightness, contrast, vertical size, horizontal size, etc., so that a user can visually recognize their control state.

In one aspect of the present invention, there is provided an on-screen display (OSD) menu implementing device for a video display appliance for displaying a video signal provided from a personal computer or video input means, the device comprising:

Key input means for selectively inputting a function control signal for selecting and controlling a function of the appliance;

control means for discriminating horizontal and vertical sync signals inputted through the personal computer or the video input means, and outputting a control signal and control data for implementing the OSD menu in accordance with the function control signal inputted from the key input means;

OSD generating means for receiving the control signal and the control data from the control means, and implementing the OSD menu representing a control state of the selected function of the appliance is implemented on a display screen, the OSD menu including unchangeable or fixed constituent elements and variable or moving constituent elements;

digital-to analog conversion means for converting the control signal and the control data outputted from the control means into analog signals to display the converted analog signals on the display screen;

storage means for storing therein the control data provided from the control means; and pre-amplifying means for pre-amplifying with a predetermined amplification factor the video signal inputted through the video input means and the OSD video signal inputted from the OSD generating means.

BRIEF DESCRIPTION OF THE DRAWINGS

The above object, other aspects, and advantages of the invention will become apparent by describing the preferred embodiments thereof with reference to the accompanying drawings, in which:

FIG. 1 is a block diagram illustrating the construction of a conventional display device for a video display appliance.

FIG. 2 is a block diagram illustrating the construction of an OSD menu implementing device for a video display appliance according to the present invention.

FIGS. 3A to 3G are views illustrating the OSD menu display states for volume control, wherein;

FIG. 3A is a view illustrating a first examplified display state of a variable histogram type OSD menu, FIG. 3B is a view illustrating a second examplified display state of a variable histogram type OSD menu, FIG. 3C is a view illustrating a third examplified display state of a variable histogram type OSD menu, FIG. 3D is a view illustrating a first examplified display state of a moving bar type OSD menu, FIG. 3E is a view illustrating a second examplified display state of a moving bar type OSD menu, FIG. 3F is a view illustrating an examplified display state of a circular graph type OSD menu, and FIG. 3G is a view illustrating an examplified display state of a moving needle type OSD menu.

DETAILED DESCRIPTION OF THE PREFERRED EMBODIMENTS

Figure 3A:
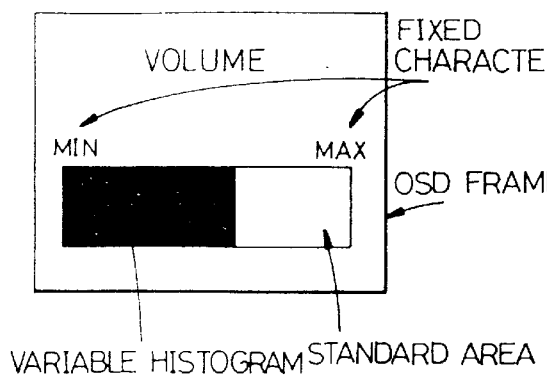

FIG. 2 is a block diagram of an OSD menu implementing device for a video display appliance according to the present invention.

Referring to FIG. 2, the OSD menu implementing device for a video display appliance for displaying a video signal provided through a personal computer (PC) or a video input section 16, includes a key input section 11 for selectively inputting a function control signal for controlling a selected function of the video display appliance, a control section 12 for discriminating horizontal and vertical sync signals separated and inputted from the PC or the video input section 16 and outputting a control signal and control data so as to implement the OSD menu in accordance with the function control signal inputted from the key input section 11, and an OSD generating section 13 for receiving the control signal and the control data from the control section 12, and implementing the OSD menu representing a control state of the selected function of the video display appliance on a display screen.

The OSD menu implementing device according to the present invention also includes a digital-to-analog (D/A) conversion section 14 for converting the control signal and the control data outputted from the control section 12 into analog signals to display the analog signals on the display screen, a storage section for storing therein the control data provided from the control section 12, a pre-amplifying section 17 for pre-amplifying with a predetermined amplification factor the video signal of R, G, and B inputted through the video input section 16 and the OSD video signal of Ro, Go, and Bo inputted from the OSD generating section 13, and a video output section 18 for outputting the video signal of R(Ro), G(Go), and B(Bo) amplified by the pre-amplifying section 17 to a display section 19.

In one embodiment of the present invention, the OSD generating section 13 comprises one OSD menu implementing means for generating signals representing at least one among characters, abstract characters, numerals, figures, symbols, etc., as constituent elements of the OSD menu to be displayed on the screen as an unchangeable or fixed portion of the OSD menu in accordance with the control signal and the control data from the control section 12, and another OSD menu implementing means for generating signals representing a variable or moving portion of the OSD menu as the constituent element of the OSD menu in accordance with an amount of variation determined in accordance with the control data.

Specifically, the OSD menu implementing means for generating the signals representing a variable or moving portion of the OSD menu as the constituent elements of the OSD menu, and generates signals representing at least one among a histogram graph, circular graph, indicating needle, and indicating bar which is displayed on the screen, as varying or moving in proportion to the amount of variation determined by the control signal and the control data from the control section 12. In other words, one OSD implementing means is a display means for displaying an unchangeable or fixed portion of the OSD menu, and the other OSD implementing means is a display means for displaying, in combination with the unchangeable or fixed portion of the OSD menu, a variable or moving portion of the OSD menu, so that the OSD menu for displaying the control state of the selected function of the appliance selected by the user through the key input section 11 can be accomplished.

In the embodiment, the control section 12 comprises a general microcomputer, and the storage section 15 comprises an EEPROM (electrically erasable programmable read only memory).

The key input section 11 may include a key panel attached to the video display appliance, a keyboard of the PC, or a remote controller.

The operation of the OSD menu implementing device for a video display appliance according to the present invention as described above will now be explained in detail with reference to FIG. 2.

First, the RGB video signal provided from the PC or the like is inputted to the pre-amplifying section 17 through the video input section 16.

At the same time, the horizontal and vertical sync signals H-Sync and V-Sync provided from the PC are discriminated by the control section 12, and as a result of the sync signal discrimination, the control section 12 outputs the control signal and the control data through a serial clock line SCL and a serial data line SDA to the OSD generating section 13 and the D/A conversion section 14, respectively, to effect the function control and the OSD menu implementation.

Meanwhile, the function control signal is selectively inputted thought the key input section 11 by the user so as to select and control one among various functions such as volume, brightness, contrast, vertical size, horizontal size, etc. The size of the OSD menu can be increased or decreased through the key input section 11 and an associated adjusting means (not illustrated) by the selection of the user.

At this time, according to the selection by the user, the function control signal inputted through the key input section 11 is converted into a digital signal by a built-in analog-to-digital converter of the control section 12, and the converted digital signal is recognized by the control section, so that the recognized value is outputted through the serial clock line SCL and the serial data line SDA.

The OSD generating section 13 receives the control signal and the control data through the serial clock line SCL and the serial data line SDA of the control section 12, and outputs the OSD video signal of Ro, Go, and Bo to the pre-amplifying section 17 to implement the OSD menu for controlling various function of the appliance.

Meanwhile, the D/A conversion section 14 converts the horizontal and vertical sync signal discriminated by and outputted from the control section 12 and a user's selection signal inputted through the key input section 11 into analog signals, respectively, and the analog signals are selectively outputted through corresponding function control signal output terminals Fl to Fn as control signals for controlling volume, brightness, contrast, horizontal size, vertical size, etc. Also, the D/A conversion section 14 adjusts the oscillating frequency of the OSD generating section 13 in accordance with the horizontal and vertical sync signals provided from the control section 12, so that the adjusted oscillating frequency is inputted to the OSD generating section 13 to adjust the output level of the OSD video signal of Ro, Go, and Bo outputted from the OSD generating section 13.

The storage section 15 comprising the EEPROM stores therein the control data inputted through the serial data line SDA of the control section 12.

The key input section 11 may include a key panel attached to the video display appliance in a body, a keyboard of the PC, or a remote controller.

The pre-amplifying section 17 amplifies the OSD video signal of Ro, Go, and Bo inputted from the OSD generating section 13 and the video signal of R, G, and B inputted from the video input section 16 with a predetermined amplification factor using a blanking signal, and outputs the amplified video signals to the video output section 18.

The video output section 18 supplies to the display section 19 the video signal of R(Ro), G(Go), and B(Bo) including the OSD video signal of Ro, Go, and Bo amplified by the pre-amplifying section 17 to display the OSD menu on the screen of the display section 19.

Meanwhile, the OSD generating section 13 receives the control signal and the control data discriminated from the horizontal and vertical sync signals by the control section 12, and displays on the screen of the display section 19 the control state of the selected function as the OSD menu according to the control signal and the control data.

As one exemplified embodiment, the OSD menu implementing means displays at least one among characters, abstract characters, numerals, figures, symbols, etc., which are the constituent elements of the OSD menu, as the unchangeable or fixed portion of the OSD menu.

As another examplified embodiment, the OSD menu implementing means displays at least one among a histogram, circular graph, indicating needle, indicating bar, etc., which are the constituent elements of the OSD menu, as the variable or moving portion of the OSD menu. This portion varies or moves in proportion to the amount of variation determined by the control data outputted from the control section 12.

FIGS. 3A to 3F show the examplified display states of the OSD menu for volume control.

Referring to FIGS. 3A to 3F, at least one among the characters, abstract characters, numerals, figures, symbols, etc., is displayed through the display section 19 as the unchangeable or fixed portion of the OSD menu implemented through the OSD generating section 16, while the variable or moving portion of the OSD menu are displayed with its size or position varied or changed in proportion to the variation amount of the control data outputted from the control section 12. In other words, at least one of the variable or moving elements such as the histogram, circular graph, indicating needle, indicating bar, etc., is displayed within an OSD menu frame through the display section 19 in combination with at least one of the unchangeable or fixed elements such as the characters, numerals, abstract characters, figures, symbols, etc.

Figure 3B:
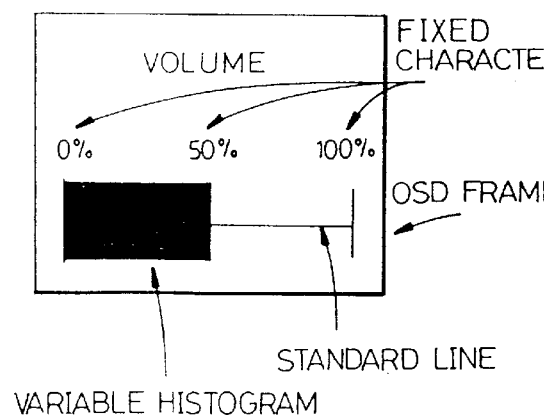
Figure 3C:
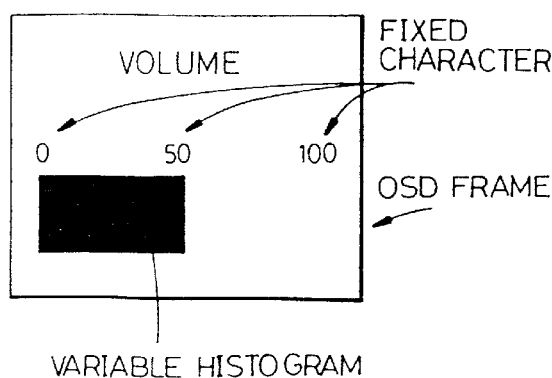
Figure 3D:
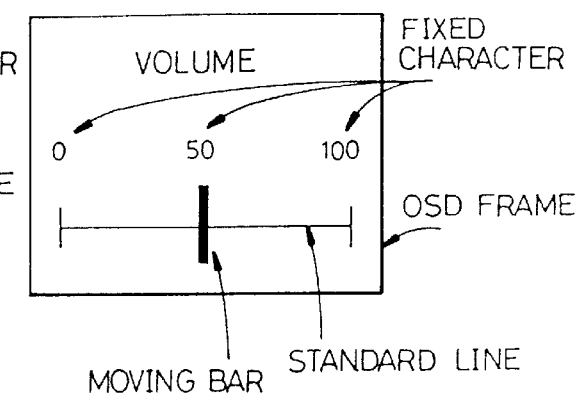
Figure 3E:
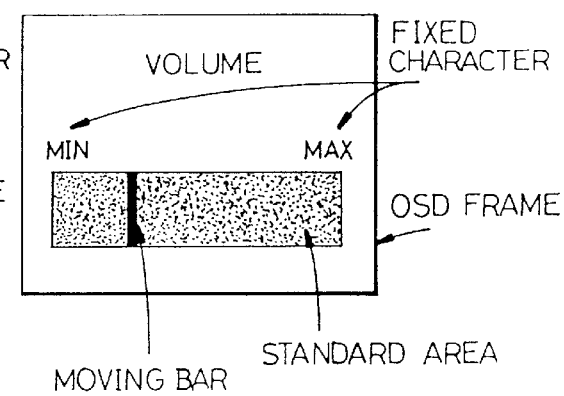
Figure 3F:
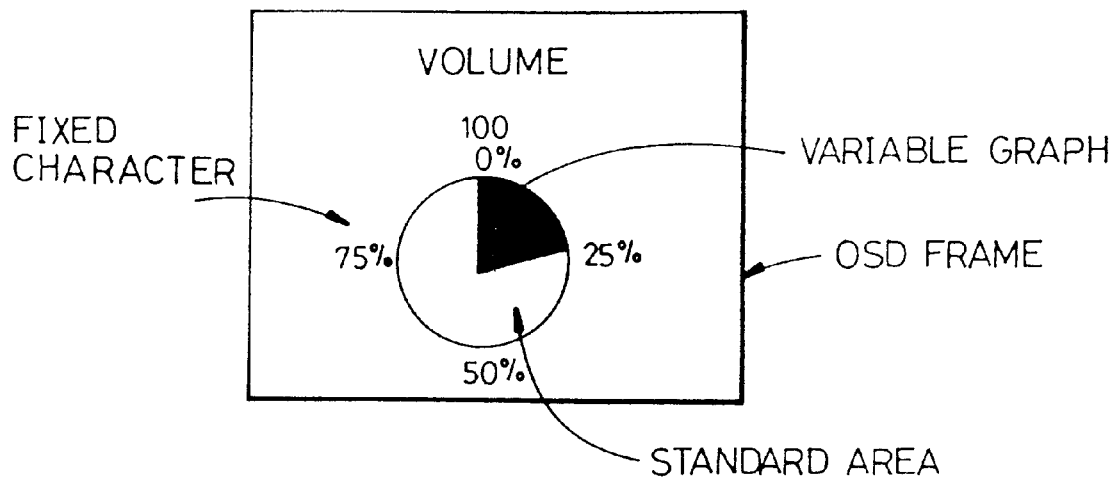

Specifically, according to an examplified display state for volume control as shown in FIGS. 3A and 3F, the variable histogram or the circular graph increases or decreases in length or size within a standard area from a starting point with the same color and brightness.

According to another examplified display state as shown in FIG. 3B, the variable histogram varies in length along a standard line from a starting point with the same color and brightness.

According to still another examplified state as shown in FIG. 3C, the variable histogram varies in length from a starting point with the predetermined standard area or standard line not shown on the screen with the same color and brightness.

According to still another examplified state as shown in FIG. 3D, a moving bar moves along a predetermined standard line with its position on the standard line being changed.

According to still another examplified state as shown in FIG. 3E, a moving needle moves within a predetermined standard area with its position on the standard line being changed.

Figure 3G:
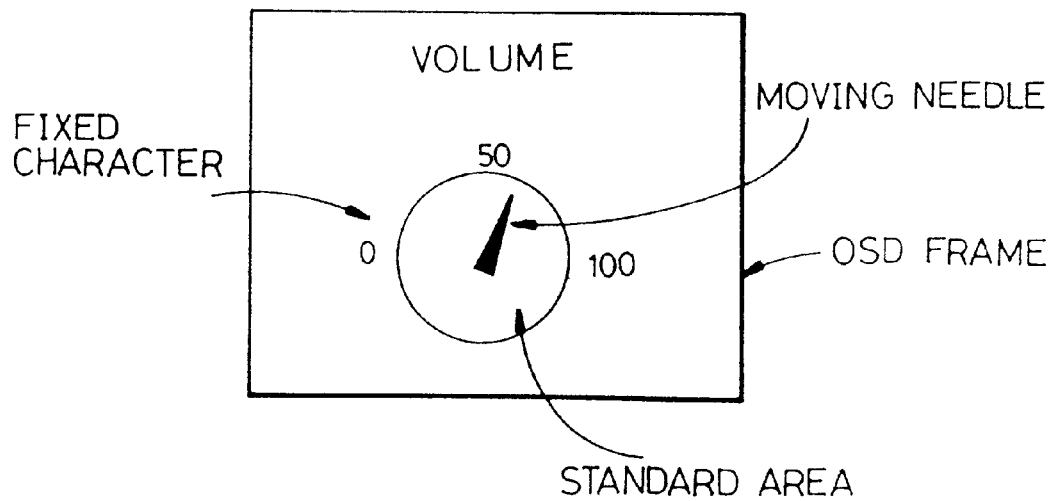

According to still another examplified state as shown in FIG. 3G, a moving needle rotates within a predetermined standard area with its direction being changed.

The OSD menu as implemented above represents the control state of volume, brightness, contrast, horizontal size, vertical size, etc., and is composed of the unchangeable or fixed elements such as characters, abstract characters, figures, numerals, symbols, etc., and the variable or moving element such as a histogram, circular graph, indicating needle, indicating bar, etc. The above elements may be represented with the same color or different colors for the user's easy recognition.

Here, the variable or moving element of the OSD menu such as the histogram, circular graph, etc., may increase or decrease with the same pattern, and the pattern, color, and brightness thereof may be selected and adjusted by the user's manipulation of the key input section 11.

Also, the unchangeable or fixed element of the OSD menu may blink in distinction from the variable or moving element.

Meanwhile, the size of the OSD menu may be adjusted by the user's adjustment of the size of the OSD frame. In this case, the size of the unchangeable or fixed constituent elements of the OSD menu may be adjusted with the same adjustment rate as that of the variable or moving constituent elements.

The OSD menu as described above is designed during an OSD masking process, and then implemented on the display section 19 by the OSD generating section 13.

As a result, the control state of a function selected by the user, such as volume, brightness, contrast, horizontal size, vertical size, etc., can be implemented as an OSD menu on the screen of the display section 19, and the constituent elements of the OSD menu can be conveniently adjusted by the user.

As described above, according to the present invention, an OSD menu representing the control state of a function of the appliance selected by the user can be implemented on a specified position of a screen, and thus the user can conveniently adjust the selected function while viewing both the OSD menu and the video signal displayed on the screen.

While the present invention has been described and illustrated herein with reference to the preferred embodiments thereof, it will be understood by those skilled in the art that various changes in form and details may be made therein without departing from the spirit and scope of the invention.

What is claimed is:

1. An on-screen display (OSD) menu implementing device for a video display appliance for displaying a video signal provided from a personal computer or video input means the device comprising:

an OSD generating section for receiving a control signal and control data corresponding to a selected function of the appliance, and for outputting an OSD video signal so that the OSD menu representing a control state of the selected function of the appliance is implemented on a display screen, the OSD menu including an unchangeable or fixed constituent element and a variable or movable constituent element, wherein a size of the OSD menu is adjusted by a user's adjustment of an OSD frame size, and a size of the unchangeable or fixed constituent element of the OSD menu is adjusted with the same adjustment rate as that of the variable or moving constituent element of the OSD menu.

2. An on-screen display (OSD) menu implementing device for a video display appliance for displaying a video signal provided from a personal computer or video input means, the device comprising:

an OSD menu implementing section for receiving a control signal and control data corresponding to a selected function of the appliance, and outputting an OSD video signal so that the OSD menu representing a control state of the selected function of the appliance is implemented on a display screen, the OSD menu implementing section including first implementing means for generating signals representing a fixed character or symbol to be displayed on the screen as an unchangeable or fixed constituent element of the OSD menu, second implementing means far generating signals representing a graphical representation of a magnitude of an adjustable quantity which is displayed on the screen as a variable or moving constituent element of the OSD menu, the variation in the graphical representation being variable in relation to an amount of variation in the adjustable quantity determined by the control signal and the control data, and third implementing means for displaying the OSD menu by properly combining the unchangeable or fixed constituent element and the variable or moving constituent element of the OSD menu implemented by the first and second implementing means, wherein a size of the OSD menu is adjusted by a user's adjustment of an OSD frame size, and a size of the unchangeable or fixed constituent element of the OSD menu is adjusted with the same adjustment rate as that of the variable or moving constituent element of the OSD menu.

3. An on-screen display (OSD) menu implementing device for a video display appliance for displaying a video signal provided from a personal computer or video input means, the device comprising:

an OSD menu implementing section for receiving a control signal and control data corresponding to a selected function of the appliance, and outputting an OSD video signal so that the OSD menu representing a control state of the selected function of the appliance is implemented on a display screen, the OSD menu implementing section including first implementing means for generating signals representing a fixed character or symbol to be displayed on the screen as an unchangeable or fixed constituent element of the OSD menu, second implementing means for generating signals representing a graphical representation of a magnitude of an adjustable quantity which is displayed on the screen as a variable or moving constituent element of the OSD menu, the variation in the graphical representation being variable in relation to an amount of variation in the adjustable quantity determined by the control signal and the control data, and third implementing means for displaying the OSD menu by properly combining the unchangeable or fixed constituent element and the variable or moving constituent element of the OSD menu implemented by the first and second implementing means, and wherein a size of the OSD menu is adjusted by a user's adjustment of an OSD frame size, and a size of the unchangeable or fixed constituent element of the OSD menu is adjusted with the same adjustment rate as that of the variable or moving constituent element of the OSD menu;

wherein the variable or moving constituent element is a histogram, pie chart, moving needle or bar, which varies or moves as the variable or moving element of the OSD graph in proportion to the variation in an amount determined by the control data starting point with the same color and brightness.

4. An OSD menu implementing device as claimed in claim 3, wherein the variable or moving element varies or moves in proportion to the amount of variation determined by the control data, from a starting point on a standard line or within a standard area with the same color and brightness.

5. An OSD implementing device as claimed in claim 3, wherein the unchangeable or fixed clement and the variable or moving element are displayed with the same color, or different colors for a user's easy recognition.

6. An OSD implementing device as claimed in claim 3, wherein, the variable histogram or pie chart, which varies or moves as the variable or moving element of the OSD graphic increases or decreases according to a fixed pattern, and the pattern, color and brightness thereof are selected and adjusted by a user s selection.

7. An OSD menu implementing device as claimed in claim 3, wherein the OSD graphic is displayed by combining the unchangeable or fixed element and the variable or moving clement, and the unchangeable or fixed clement blinks in distinction from the variable or moving element.

8. An OSD implementing device as claimed in claim 3, wherein the variable or moving constituent element of the OSD graphic varies or moves within a standard area or line which is displayed in distinction from the variable or moving constituent clement in line or color.

\* \* \* \* \*